United States Patent
Alpers

[15] 3,651,326
[45] Mar. 21, 1972

[54] PASSIVE ELECTRO-OPTICAL SEEKER

[72] Inventor: Frederick C. Alpers, Riverside, Calif.
[73] Assignee: The United States of America as represented by the Secretary of the Navy
[22] Filed: Sept. 1, 1965
[21] Appl. No.: 485,676

[52] U.S. Cl...................250/203 CT, 250/203 R, 178/6.8
[51] Int. Cl.................................................G01s 3/78
[58] Field of Search............178/6.8; 250/203 CT; 33/46.5; 350/272, 274; 343/14

[56] References Cited

UNITED STATES PATENTS 3,341,653  9/1967  Kruse, Jr..........................250/203 CT Primary Examiner—Rodney D. Bennett, Jr.
Assistant Examiner—H. A. Birmiel
Attorney—G. J. Rubens, J. M. St. Amand and T. M. Phillips

[57] ABSTRACT

An electro-optical seeker requiring a simple circular scan centered on the target which can track a wide variety of targets with respect to size, range degree of brightness, and extent of background contrast, and provide coordinate information regarding the position of the object tracked.

10 Claims, 3 Drawing Figures

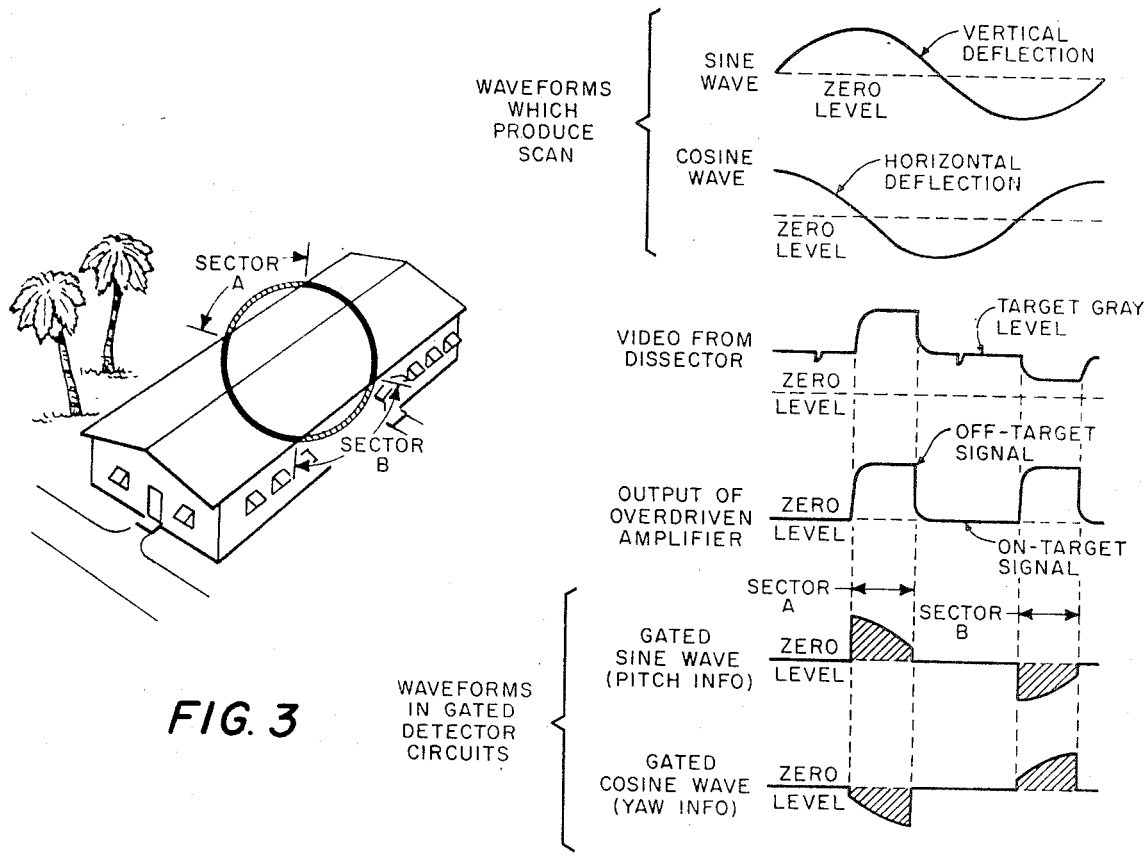
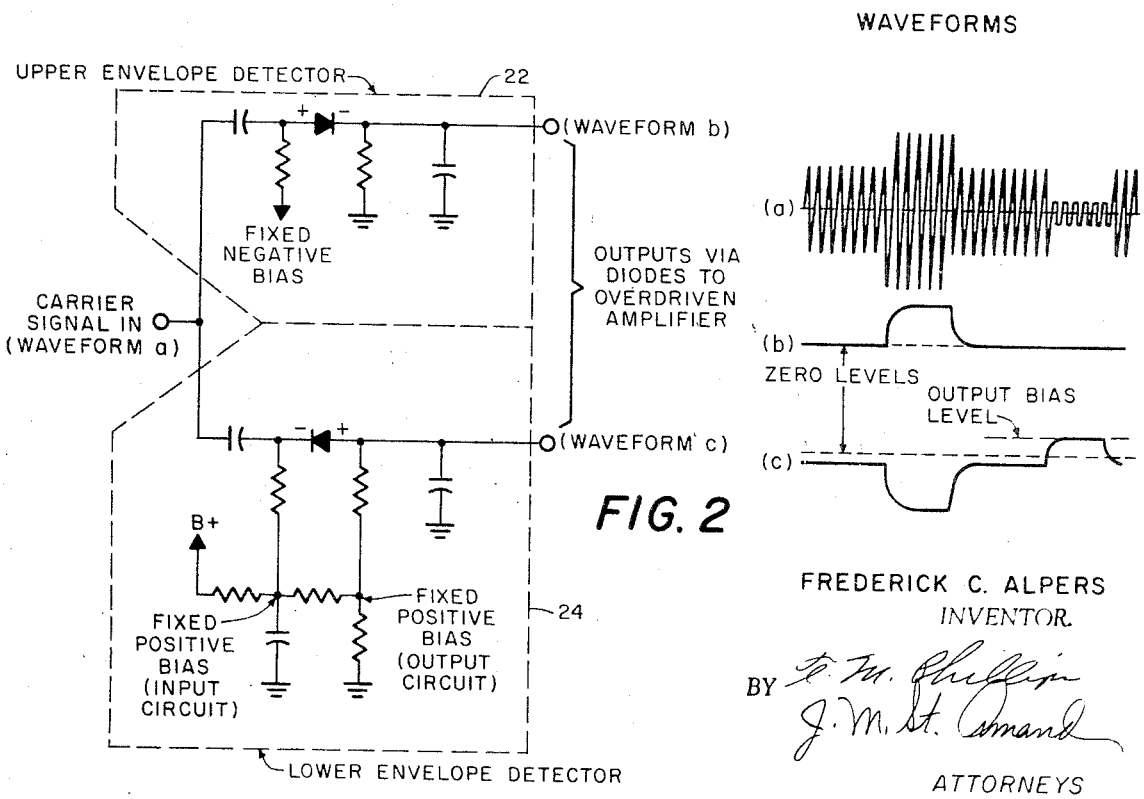

3,651,326

PASSIVE ELECTRO-OPTICAL SEEKER

The invention herein described may be manufactured and used by or for the Government of the United States of America for governmental purposes without the payment of any royalties thereon or therefor.

The present invention relates to passive electro-optical seekers and more particularly to passive electro-optical seekers wherein an overlapping circular scan is produced to determine the center of the scan and its coordinates.

Various electro-optical seekers have been designed which individually utilize edge tracking, edge repelling, center tracking, gray level tracking, or correlation techniques to track a selected object within a scene and provide coordinate information regarding the position of the object tracked. However, these systems are of a complex nature.

An object of the present invention is to provide a passive electro-optical seeker which is simple in construction as compared with prior known systems.

Another object of the invention is to provide a passive electro-optical system which is relatively simple in construction, which can track a wide variety of targets with respect to size, range, degree of brightness, and extent of contrast with background, and which provides coordinate information with respect to target center rather than point of highest contrast.

Another object is to provide a passive electro-optical system which requires only a simple circular scan centered on the target in lieu of a systematic scan of the entire target scene and thereby attains a faster tracking rate while retaining comparable resolution to other known systems.

Other objects and many of the attendant advantages of this invention will become readily appreciated as the same becomes better understood by reference to the following detailed description when considered in connection with the accompanying drawings wherein:

FIG. 2 is a circuit diagram with accompanying waveforms of the upper and lower envelope detector biasing arrangement;

FIG. 3 is a sketch of the scanning action and associated waveforms to illustrate the functioning of the gated detectors in deriving the target coordinate information.

Figure 1:
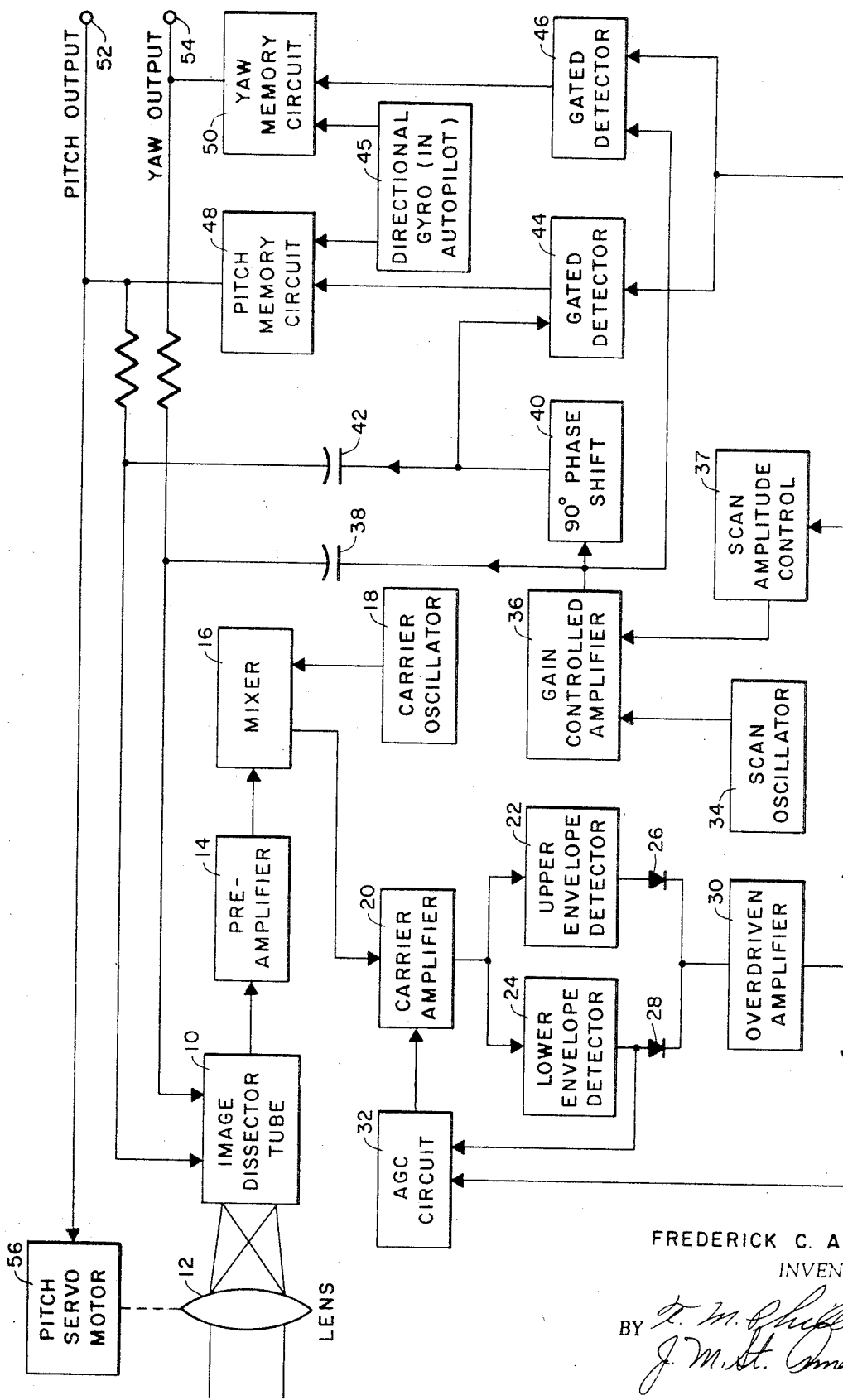
FIG. 1 is a block diagram of the seeker system embodying the invention.

Referring now to FIG. 1, there is shown an image dissector tube 10 for sensing an image focused on its faceplate by means of movable lens 12. The output signal from dissector tube 10 is amplified in preamplifier 14 and fed to mixer 16 where it is modulated with a signal from carrier oscillator 18 (a signal source of 250 kc. has been found to be satisfactory). The output of mixer 16 is amplified by carrier amplifier 20 and fed to upper and lower envelope detectors 22, 24. As shown in FIG. 2, upper envelope detector 22 is designed with a fixed negative input bias so that the output of this detector remains at zero or ground potential unless the carrier signal amplitude exceeds the bias level, in which case a positive output results. Lower envelope detector 24 is correspondingly designed with a fixed positive input bias, but also has a somewhat smaller fixed positive bias on the output side, so that this latter positive bias will appear as the output unless the carrier signal amplitude exceeds the net bias across the detector diode, in which case the output will be driven toward zero voltage or onward into the negative voltage region. The three biases are selected so that there is a small region of intermediate carrier signal amplitudes for which the output of upper envelope detector 22 is zero and the output of lower envelope detector 24 is simultaneously zero or negative.

Returning now to FIG. 1, the outputs of detectors 22 and 24 are respectively fed through diodes 26 and 28 to an overdriven amplifier 30. The output of lower detector 24 is also fed to a gated automatic gain control circuit 32 which controls the gain of carrier amplifier 20. Diodes 26 and 28 only pass positive signals, but, because of the design of envelope detectors 22 and 24 explained above, there is a positive signal fed to one or the other of diodes 26 and 28 at all times except when the carrier signal amplitude falls within the previously identified small region of intermediate amplitudes. When the seeker is initially locked to the desired target (through action of a human operator or by acquisition means that are not a part of this invention), the gain of carrier amplifier 20 is adjusted so that the carrier signal that results when dissector 10 scans the image of the desired target is made to have an amplitude that falls within this small region of intermediate amplitudes. This region therefore becomes identified with the target gray level. Since only the positive signals from envelope detectors 22 and 24, which are those signals which differ from the target gray level, are used to drive overdriven amplifier 30, it is "off" when the scan is within and "on" when the scan is outside the desired area of the target.

The output of overdriven amplifier 30 is coupled to automatic gain control (AGC) circuit 32 and is used to clamp its action. When there is no gating output from amplifier 30, AGC circuit 32 samples the output of lower detector 22, which corresponds to the target gray level at the particular instant in flight, and adjusts the gain of carrier amplifier 20 to maintain the sampled output at the identified intermediate amplitude level. When a gate signal from amplifier 30 is present, the AGC action is clamped and the gain of carrier amplifier 20 remains at the level established during the preceding sampling period. This sampling process updates the carrier amplifier gain so that the identified intermediate carrier signal amplitude continues to represent the target gray level in the event the latter changes during flight, and the effect achieved is that of tracking the target gray level. As alternative constructions, AGC circuit 32 can effect this tracking of target gray level by controlling the voltage across the electron multiplier portion of dissector 10, or by varying the bias voltages in envelope detectors 22, 24. With either of these constructions carrier amplifier 20 would be replaced with a video amplifier, and mixer 16 and carrier oscillator 18 would be eliminated. These lead to the use of fewer components, but do not provide operation over as wide a dynamic range of input light levels as does the carrier amplifier construction that has been described.

Scan oscillator 34 provides scan voltages for dissector tube 10. In order to have a circular scan, sine and cosine voltages are applied to the dissector horizontal and vertical deflection elements, respectively. This is accomplished by amplifying the sinusoidal voltage from oscillator 34 in gain controlled amplifier 36 and coupling the output voltage directly to tube 10 by means of capacitor 38 and indirectly through a 90° phase shifter 40 and capacitor 42. The amplitude of amplifier 36 is controlled by scan amplitude control 37. The sine-cosine signals that are applied to dissector tube 10 and create the circular scan are also fed to gated detectors 44, 46. There the sine-cosine signals are sampled by the gating action of the output from overdriven amplifier 30, and the samples of opposite polarity are integrated and summed. The outputs of detectors 44, 46 are then proportional to the time duration, the amplitude, and the direction in which the larger portion of the scan circle is outside the target as defined by the "off-target" and "on-target" outputs of amplifier 30. This functioning of gated detectors 44, 46 may be more readily understood by reference to FIG. 3, wherein the scanning of a target is represented and the corresponding waveforms involved in the gated detector action are given.

When the seeker system is used on a missile or aircraft which experiences pitch or yaw motions with respect to the reference system of the target being tracked, it is advantageous from the standpoint of tracking performance to provide space stabilization of the tracking axis against such missile or aircraft motions. This can be accomplished by mechanical stabilization of the lens and dissector portion of the system, or, as shown in FIG. 1, through electronic stabilization provided by directional gyroscope 45, which may be one physically located in the missile or aircraft autopilot. To this end signals from gyroscope 45 are summed with signals from gated detectors 44, 46 at the input of memory circuits 48, 50. The output of gated detector 44 is fed to pitch memory circuit 48 while the output of gated detector 46 is fed to yaw memory circuit 50. The signal voltages stored in memory circuits 48, 50 are used to control the DC level of the deflection voltages fed to image dissector tube 1^. As the scanning circle moves outside the target area, error information derived by gating the sine and cosine signals adds or subtracts charge from memory circuits 48, 50, which then in turn change the deflection voltages of tube 10 to bring the circle back within the target area. Likewise, pitch or yaw motions of a missile or aircraft which carries the seeker will cause changes in the signals from gyroscope 45, and these in turn will result in changes of the deflection voltages of tube 10 to keep the tracking axis stabilized in space so that little or no tracking correction is needed to overcome these motions alone.

The size of the scanning circle is steadily increased to compensate for target growth due to range closure. Since the ratio of the duration of the gates from overdriven amplifier 30 to the total period of one complete circular scan cycle corresponds to the proportion of time the scan is outside the target area, the gates may be time averaged in a capacitor circuit 37 which serves to control the amplitude of the scanning circle and keeps it in proper proportion to the target size.

Pitch and yaw error signals appearing at output terminals 52, 54 are fed to the flight control section, where a steering computer or autopilot translates them into the proper signals for the control surface actuations to provide directional control of the missile or aircraft. As indicated, the feedback from directional gyroscope 45 in the autopilot serves to space stabilize the position of the circular scan with respect to the target image and minimize any tracking corrections brought on by transients in control of the airframe. The output signal of pitch memory circuit is fed to pitch servo motor 56 where lens 12 is controlled in the manner described in my copending application Ser. No. 485,675 for "Image Stabilization System" filed Sept. 1, 1965.

Obviously many modifications and variations of the present invention are possible in the light of the above teachings. It is therefore to be understood that within the scope of the appended claims the invention may be practiced otherwise than as specifically described.

What is claimed is:

1. In an electro-optical seeker, the combination comprising:
    a. electro-optical means for viewing a target of interest and producing video output signals,
    b. a source of carrier frequency,
    c. mixer means coupled to said carrier frequency source and to said electro-optical circuit means for producing an output signal modulated by said video signal,
    d. envelope detecting means coupled to said mixer means for detecting the upper and lower envelope of said video modulated signal,
    e. circuit means coupled to said electro-optical means for generating a circular scan voltage,
    f. signal comparison circuit means coupled to said circular scan circuit means and to said envelope detecting means for producing output signals proportional to the asymmetry of the video output signals with respect to said circular scan voltage.

2. The seeker of claim 1 wherein said envelope detecting means comprises:
    a. an upper envelope detector with a negative input bias sufficient to maintain the output at ground potential until a carrier signal which exceeds the negative bias level is received which produces a positive output signal,
    b. a lower envelope detector with a positive input bias of a predetermined value and an output bias of a value less than said positive input bias to permit a positive output from said lower envelope detector until the carrier signal amplitude exceeds the combined effect of said positive biases,
    c. whereby there will be a small region of intermediate carrier signals amplitudes for which the output of said upper envelope detector is zero and the output of said lower envelope detector is simultaneously zero or negative.

3. In an electro-optical seeker, the combination comprising:
    a. electro-optical means for viewing a target of interest and producing video output signals,
    b. a source of carrier frequency,
    c. mixer means coupled to said carrier frequency source and to said electro-optical circuit means for producing an output signal modulated by said video signal,
    d. envelope detecting means coupled to said mixer means for detecting the upper and lower envelope of said video modulated signal,
    e. an overdriven amplifier having an input coupled to the output of said envelope detecting means and being turned on in response to positive signals of a predetermined value which represents the desired target being in view and being turned off in the absence of said positive signal which represents the desired target being out of view,
    f. circuit means coupled to said electro-optical means for generating a circular scan voltage,
    g. signal comparison circuit means coupled to said circular scan circuit means and to said envelope detecting means for producing output signals proportional to the asymmetry of the video output signals with respect to said circular scan voltage.

4. In an electro-optical seeker, the combination comprising:
    a. electro-optical means for viewing a target of interest and producing video output signals,
    b. a video amplifier coupled to said electro-optical means for amplifying the video output signals,
    c. envelope detecting means coupled to said video amplifier for detecting said video signal,
    d. automatic gain control circuit means coupled to the output of said detecting means for varying the bias of said envelope detecting means,
    e. circuit means coupled to said electro-optical means for generating a circular scan voltage,
    f. signal comparison circuit means coupled to said circular scan circuit means and to said envelope detecting means for producing output signals proportional to the asymmetry of the video output signals with respect to said circular scan voltage.

5. In an electro-optical seeker, the combination comprising:
    a. electro-optical means for viewing a target of interest and producing video output signals,
    b. a source of carrier frequency,
    c. mixer means coupled to said carrier frequency source and to said electro-optical circuit means for producing an output signal modulated by said video signal,
    d. envelope detecting means coupled to said mixer means for detecting the upper and lower envelope of said video modulated signal,
    e. circuit means coupled to said electro-optical means for generating a circular scan voltage,
    f. signal comparison circuit means coupled to said circular scan circuit means and to said envelope detecting means for producing output signals proportional to the asymmetry of the video output signals with respect to said circular scan voltage,
    g. signal voltage storage means coupled to said signal comparison circuit means and to said image dissector tube for feeding corrective dc deflection voltages to said dissector tube to return the scan circle back to the target area in response to said asymmetry video output signals.

6. In an electro-optical seeker, the combination comprising:
    a. lens means for viewing a target of interest,
    b. an image dissector tube having a faceplate on which an image of said target is focused by said lens means and producing video output signals,
    c. a source of carrier frequency signal,
    d. mixer means coupled to said carrier frequency source and to said image dissector tube for modulating said carrier signals with said video signals,
    e. envelope detecting means coupled to said mixer means for detecting the upper and lower envelope of the video modulated carrier signal, f. circuit means coupled to said image dissector tube for producing a circular scan on the faceplate of said dissector tube, g. signal comparison circuit means coupled to said circular scan circuit means and to said envelope detecting means for producing output signals proportional to the asymmetry of the target signal image with respect to said circular scan.

7. In an electro-optical seeker, the combination comprising:

a. lens means for viewing a target of interest, b. an image dissector tube having a faceplate on which an image of said target is focused by said lens means and producing video output signals, c. a source of carrier frequency signal, d. mixer means coupled to said carrier frequency source and to said image dissector tube for modulating said carrier signals with said video signals, e. envelope detecting means coupled to said mixer means for detecting the upper and lower envelope of the video modulated carrier signal, f. circuit means coupled to said image dissector tube for producing a circular scan on the faceplate of said dissector tube, g. circuit means coupled between said envelope detecting means and said circular scan circuit means for controlling the size of the circular scan in proportion to target size, h. signal comparison circuit means coupled to said circular scan circuit means and to said envelope detecting means for producing output signals proportional to the asymmetry of the target signal image with respect to said circular scan.

8. In an electro-optical seeker, the combination comprising:

a. lens means for viewing a target of interest, b. an image dissector tube having a faceplate on which an image of said target is focused by said lens means and producing video output signals, c. a source of carrier frequency signal, d. mixer means coupled to said carrier frequency source and to said image dissector tube for modulating said carrier signals with said video signals, e. amplifier means having a first input coupled to the output of said mixer means, a second input and an output, f. envelope detecting coupled to the output of said amplifier means for detecting the upper and lower envelope of the video modulated carrier signal, g. automatic gain control circuit means coupled between the output of said envelope detecting means and the second input of sad amplifier means for controlling the gain, h. circuit means coupled to said image dissector tube for producing a circular scan on the faceplate of said dissector tube, i. signal comparison circuit means coupled to said circular scan circuit means and to said envelope detecting means for producing output signals proportional to the asymmetry of the target signal image with respect to said circular scan.

9. In an electro-optical seeker, the combination comprising:

a. lens means for viewing a target of interest, b. an image dissector tube having a faceplate on which an image of said target is focused by said lens means and producing video output signals, c. a source of carrier frequency signal, d. mixer means coupled to said carrier frequency source and to said image dissector tube for modulating said carrier signals with said video signals, e. amplifier means having a first input coupled to the output of said mixer means, a second input and an output, f. envelope detecting coupled to the output of said amplifier means for detecting the upper and lower envelope of the video modulated carrier signal, g. automatic gain control circuit means coupled between the output of said envelope detecting means and the second input of said amplifier means for controlling the gain, h. an oscillator for generating scan voltages, i. circuit means coupled to said scan oscillator and to said image dissector tube for coupling the output of said scan oscillator directly to said dissector tube, j. 90° phase shift circuit means coupled to said scan oscillator and to said dissector tube for coupling the output of said scan oscillator to said dissector, k. signal comparison circuit means coupled to said direct circuit coupling means, said 90° phase shifter means and the output of said envelope detecting means for producing an output signal when there is a difference in the input signals.

10. In an electro-optical seeker, the combination comprising:

a. lens means for viewing a target of interest, b. an image dissector tube having a faceplate on which an image of said target is focused by said lens means and producing video output signals, c. a source of carrier frequency signal, d. mixer means coupled to said carrier frequency source and to said image dissector tube for modulating said carrier signals with said video signals, e. amplifier means having a first input coupled to the output of said mixer means, a second input and an output, f. envelope detecting coupled to the output of said amplifier means for detecting the upper and lower envelope of the video modulated carrier signal, g. automatic gain control circuit means coupled between the output of said envelope detecting means and the second input of said amplifier means for controlling the gain, h. an oscillator for generating scan voltages, i. circuit means coupled to said scan oscillator and to said image dissector tube for coupling the output of said scan oscillator directly to said dissector tube, j. 90° phase shift circuit means coupled to said scan oscillator and to said dissector tube for coupling the output of said scan oscillator to said dissector, k. a first gated detector having a first input coupled to the output of said 90° phase shifter and a second input coupled to the output of said envelope detecting means for producing an output signal when there is a coincidence of the input signals, l. a second gated detector having a first input coupled to the output of said scan oscillator and a second input coupled to the output of said envelope detecting means for producing an output signal when there is a coincidence of the two input signals.

* * * * *